(12) United States Patent
Walker (10) Patent No.: US 11,067,341 B2
(45) Date of Patent: Jul. 20, 2021

(54) HEAT TRANSFER DEVICE AND SPACECRAFT COMPRISING SUCH A HEAT TRANSFER DEVICE

(71) Applicant: AIRBUS DEFENCE AND SPACE SAS, Toulouse (FR)

(72) Inventor: Andrew Walker, Toulouse (FR)

(73) Assignee: AIRBUS DEFENCE AND SPACE SAS, Toulouse (FR)

(*) Notice: Subject to any disclaimer, the term of this patent is extended or adjusted under 35 U.S.C. 154(b) by 0 days.

(21) Appl. No.: 16/486,853

(22) PCT Filed: Mar. 13, 2018

(86) PCT No.: PCT/FR2018/050595
§ 371 (c)(1),
(2) Date: Aug. 19, 2019

(87) PCT Pub. No.: WO2018/172659
PCT Pub. Date: Sep. 27, 2018

(65) Prior Publication Data
US 2020/0232716 A1    Jul. 23, 2020

(30) Foreign Application Priority Data

Mar. 13, 2017   (FR) ..................................... 1752027
May 2, 2017    (FR) ..................................... 1753847

(51) Int. Cl.
*F28D 15/04* (2006.01)
*B01F 13/00* (2006.01)
(Continued)

(52) U.S. Cl.
CPC .......... *F28D 15/04* (2013.01); *B01F 13/0005* (2013.01); *B64G 1/503* (2013.01); *B64G 1/506* (2013.01); *F28D 2021/0021* (2013.01)

(58) Field of Classification Search
CPC ......... B64G 1/503; B64G 1/506; F28D 15/04; F28D 2021/0021; B01F 13/0005
See application file for complete search history.

(56) References Cited

U.S. PATENT DOCUMENTS

| 4,515,206 A | 5/1985 | Carr |
| 5,188,171 A | 2/1993 | Stefanov et al. |

(Continued)

FOREIGN PATENT DOCUMENTS

DE    30 17 252    11/1981

OTHER PUBLICATIONS

Matthew R. Pearson; Jamal Seyed-Yagoobi; Experimental Study of Linear and Radial Two-Phase Heat Transport Devices Driven by Electrohydrodynamic; Journal of Heat Transfer; Feb. 2015, vol. 137 (Year: 2015).*

(Continued)

*Primary Examiner* — Gordon A Jones
(74) *Attorney, Agent, or Firm* — Nixon & Vanderhye P.C.

(57) ABSTRACT

A heat transfer device is disclosed having a housing including a first main wall and a second main wall, the housing having a sealed internal cavity, a liquid contained in the internal cavity, and a mixer able to set the liquid in motion, the heat transfer device being able to be switched between a first state and a second state in which the liquid is in motion and transfers heat by convection between the first main wall and the second main wall, the thermal conductance between the first main wall and the second main wall in the first state being four times less than the thermal conductance between the first main wall and the second main wall in the second state.

13 Claims, 4 Drawing Sheets

(51) Int. Cl.
*B64G 1/50* (2006.01)
*F28D 21/00* (2006.01)

(56) References Cited

U.S. PATENT DOCUMENTS

| | | | |
|---|---|---|---|
| 5,222,548 A | 6/1993 | Biggers et al. | |
| 5,682,943 A * | 11/1997 | Yao | F28D 15/0233 |
| | | | 165/104.21 |
| 7,381,246 B1 * | 6/2008 | Zhao | B03C 3/45 |
| | | | 55/DIG. 38 |
| 8,714,492 B2 * | 5/2014 | Goodzeit | B64G 1/506 |
| | | | 244/171.8 |
| 9,902,507 B2 * | 2/2018 | Walker | B64G 1/645 |
| 9,908,643 B2 * | 3/2018 | Smith | B64G 1/503 |
| 10,755,872 B2 * | 8/2020 | Hiller | H01B 7/29 |
| 2002/0036890 A1 | 3/2002 | Furuya | |
| 2004/0021927 A1 * | 2/2004 | Milne | G02F 1/155 |
| | | | 359/265 |
| 2006/0090882 A1 | 5/2006 | Sauciuc | |
| 2008/0236794 A1 | 10/2008 | St. Louis | |
| 2011/0027621 A1 * | 2/2011 | Deane | H01M 10/4264 |
| | | | 429/7 |
| 2013/0276981 A1 * | 10/2013 | Silveira | H05H 1/00 |
| | | | 156/345.29 |
| 2014/0224939 A1 * | 8/2014 | Wong | F28D 15/04 |
| | | | 244/171.8 |
| 2017/0038166 A1 | 2/2017 | Barron et al. | |

OTHER PUBLICATIONS

French International Search Report for PCT/FR2018/050595 with English translation and Written Opinion of the Searching Authority, 15 pages, dated May 25, 2018.
French International Preliminary Report on Patentability (IPRP) for PCT/FR2018/050595, and English language translation of the Written Opinion, 16 pages, dated Mar. 4, 2019.

* cited by examiner

HEAT TRANSFER DEVICE AND SPACECRAFT COMPRISING SUCH A HEAT TRANSFER DEVICE

CROSS RELATED APPLICATIONS

This application is the U.S. national phase of International Application No. PCT/FR2018/050595 filed Mar. 13, 2018, which claims priority to French Patent Application No. 17 52027 filed on Mar. 13, 2017, and French Patent Application No. 17 53847 filed on May 2, 2017, and the entire contents of each of which are hereby incorporated by reference.

The present invention lies in the field of heat transfer devices. The present invention has applications in many technical fields that require controlled heat transfer, particularly in the aerospace field and more particularly for satellites in geostationary orbit.

Due to the revolution of the earth around the sun, the different faces of a geostationary satellite do not receive the same amount of solar radiation during an orbit. In particular, the East and West faces are alternately exposed to the sun and in the shade, which produces a variable thermal environment for the satellite: sometimes very hot, sometimes very cold. As a result, the East and West faces are usually thermally insulated from the satellite. The dissipation of heat released by the satellite's equipment essentially occurs via the North and South walls, which limits the satellite's heat emission capacity to the capacity of the North and South radiators. In addition, the radiators are sized so that the equipment remains at a temperature below what is compatible with their proper operation in the most unfavorable case, which is often called the "worst case hot". This sizing for the "worst case hot" can then lead to excessive cooling of the various equipment items, especially when they are not in operation, to a temperature below the minimum temperature they can withstand. This necessitates the presence of heating devices to maintain the equipment at a sufficient temperature in the most unfavorable case often referred to as the "worst case cold". In addition, it is necessary for the satellite's solar generator to be able to provide the necessary electrical power, which is not necessarily available, particularly during the electrical transfer phase, where the power to the payload equipment is cut off and the power supply is reserved for the electric thrusters ensuring the transfer to geostationary orbit.

In the usual case the heat transport to the radiators occurs via heat pipes. These heat pipes operate completely passively and bidirectionally, so that the problem is particularly critical because the heat pipe will continue to transfer heat between the radiators with no possibility of stopping it.

The object of the present invention is to provide a controllable, lightweight, and reliable heat transfer system which resolves the above disadvantages.

For this purpose, the invention relates to a heat transfer device capable of transferring heat between a first object and a second object, comprising a housing having a first main wall and a second main wall, the first main wall being intended to be in direct thermal contact by conduction with said first object, the second main wall being intended to be in direct thermal contact by conduction with said second object, said housing comprising a sealed internal cavity, a dielectric liquid contained in the internal cavity, and a mixer able to set said dielectric liquid in motion, the heat transfer device being able to be switched between a first state in which the dielectric liquid is stagnant and a second state in which the dielectric liquid is in motion and transfers heat by forced convection between the first main wall and the second main wall, the mixer comprising at least two electrodes arranged with a spacing between one another and immersed in the dielectric liquid, the electrodes and the liquid forming an electrohydrodynamic system, when the heat transfer device is switched into the second state, the dielectric liquid passes across the electrodes during a forced convection movement the thermal conductance between the first main wall and the second main wall when the transfer device is in the first state being four times less than the thermal conductance between the first main wall and the second main wall when the transfer device is in the second state.

Advantageously, the heat transfer device can be a good heat exchanger in one state and a good thermal insulator in the other state. When it is coupled to other heat transfer means, it can thus function as a thermal switch for that transfer means.

Advantageously, the heat transfer device is bidirectional. It is therefore compatible with other bidirectional heat transfer means such as heat pipes. The heat transport can thus occur either from the heat pipe towards the second main wall of the housing or from the second main wall of the housing towards the heat pipe.

Advantageously, this heat transfer device has a low mass and consumes little electrical energy.

Advantageously, this heat transfer device has a small footprint.

According to some particular embodiments, the heat transfer device comprises one or more of the following features:

The transfer device further comprises said first object and the first object is a heat pipe.

The transfer device further comprises said second object and the second object is a heat pipe. According to one embodiment, the first main wall is in direct thermal contact with said heat pipe. According to another embodiment, at least one among the first object and the second object is integrated into at least one wall among the first main wall and the second main wall.

At least one wall among the first main wall and the second main wall has a flat outer face.

Advantageously, this flat wall facilitates heat exchange with a flat object.

The housing has the shape of a parallelepiped having a length, a width, and a height, the height being the distance between the first main wall and the second main wall, and the height has a dimension two times smaller than said width.

Advantageously, this flat shape reduces the power required to drive the fluid and increases the exchange surface area at constant volume.

The electrodes extend in a plane parallel to the central plane of the main walls.

Advantageously, this type of mixer is reliable because it has no mechanical parts that could wear out after repeated contacts.

The mixer comprises a first holder able to carry at least two electrodes and a second holder able to carry at least two electrodes, the first and the second holders being arranged next to one another in a same plane parallel to a main wall, the at least two electrodes carried by the first holder being supplied a first voltage, the at least two electrodes carried by the second holder being supplied a second voltage, said second voltage being of opposite sign to the first voltage, the circulation of fluid between the electrodes of the first holder and the circulation of fluid between the electrodes of the second holder being in opposite directions. The thermal conductance between the first main wall and the second main wall in the first state is less than 40 W/K/m² and advantageously less than 8 W/K/m².

The thermal conductivity between the first main wall and the second main wall in the second state is greater than 250 W/K/m² and advantageously greater than 800 W/K/m².

The invention also relates to a spacecraft comprising:

a body having a North face, a South face opposite to the North face, an East face, and a West face opposite to the East face;

at least one radiator carried by at least one face among the North face, the South face, the East face, or the West face;

at least one dissipative equipment item connected by a nominal heat transfer device to at least one radiator;

characterized in that the nominal heat transfer device comprises at least one heat transfer device according to the features mentioned above, so as to enable switchable thermal conductance between the dissipative equipment item and the radiator, according to the state of the heat transfer device.

Alternatively, the spacecraft comprises at least one redundant heat transfer device, a nominal heat pipe, and a redundant heat pipe, and a main wall of the main transfer device and a main wall of the redundant transfer device is in thermal contact with said nominal heat pipe and said redundant heat pipe.

The invention will be better understood by reading the description which follows, given solely as an example and with reference to the figures in which.

Figure 1:
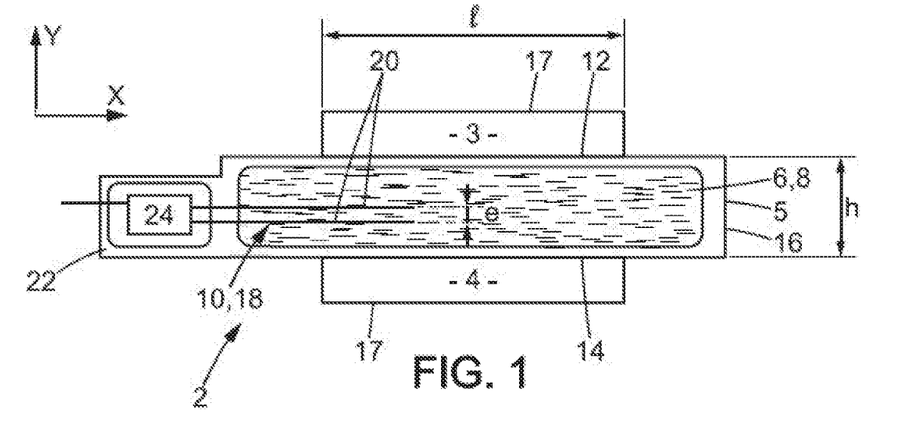
FIG. 1 is a schematic sectional view of a heat transfer device according to a first embodiment of the invention, of the first and second objects, the heat transfer device being in a first state.

With reference to FIG. 1, the heat transfer device 2 according to the invention is able to transfer or not transfer heat by forced convection between a first object 3 and a second object 4. It acts as a thermal switch.

Figure 7:
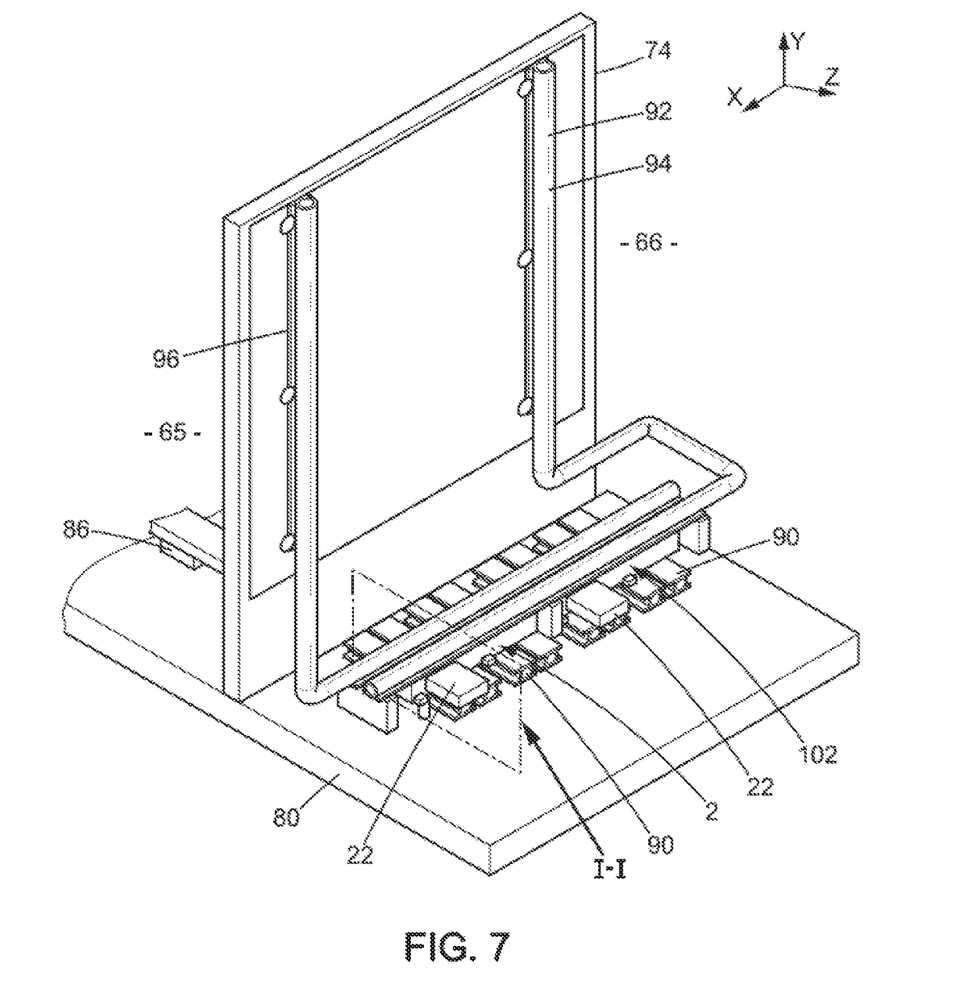
FIG. 7 is a schematic perspective view of a portion of a spacecraft comprising two heat transfer devices mounted to provide redundancy.

The heat transfer device 2 may for example be mounted in a spacecraft or in any other device requiring control of a flow of heat. The first 3 and second 4 objects then for example are constituted by heat pipes, electronic components, support plates of these electronic components, equipment items. Thus, FIG. 1 may for example represent a sectional view along plane I-I of a heat device and of two heat pipes in a portion of a spacecraft as illustrated in FIG. 7.

According to the first embodiment of the invention illustrated in FIG. 1, the heat transfer device 2 comprises a hollow housing 5 defining an internal cavity 6, a liquid 8 contained in the internal cavity 6, and a mixer 10 suitable for setting the liquid in motion and causing an increase in the thermal conduction between two parts of the housing 5.

The housing 5 is sealed closed.

In the embodiment of FIG. 1, the housing 5 has a generally rectangular parallelepiped shape provided with a hollow appendage. It has a first main wall 12, a second main wall 14 opposite to the first main wall, and four side walls 16. The housing 5 has a length L, a width I, and a height h, the height h being defined as the distance between the first main wall 12 and the second main wall 14.

The housing 5 is preferably flat. Thus, the housing 5 has a height two times smaller in dimension than its width I. Its first 12 and second 14 main walls are in thermal contact with the first 3 and second 4 objects.

In this embodiment, advantageously, the first 12 and second 14 main walls have a flat outer face 17. This flatness facilitates the heat exchange with the first and second objects.

According to the invention, the housing has a width of between 50 mm and 90 mm.

Preferably, the housing has a width of about 60 mm. This width makes it possible to have two heat pipes of the conventional type side by side, the width of the heat pipes being arranged in the widthwise direction of the housing. Indeed, a conventional heat pipe has a width of about 30 mm and a length defined according to manufacturer requirements. Thus, for example in the spacecraft illustrated in FIG. 7, two housings are arranged in the extension of one another with their longitudinal axis arranged in the X direction, and two conventional heat pipes are arranged side by side on the housing with their longitudinal axis parallel to the longitudinal axis of the housing, in other words in the X direction. Advantageously, a width of about 60 mm allows placing two heat pipes in parallel to provide a redundancy function. This redundancy ensures the transport of heat even when one of the two heat pipes has been pierced by a meteorite.

In a variant, the housing has a width greater than 90 mm. This variant is used when a large number of heat pipes are arranged side by side with their longitudinal axis in the lengthwise direction of the housing.

The housing has a length of between 100 mm and 500 mm.

Preferably, the housing has a length of about 200 mm. Such a length advantageously allows sufficient heat transport and heat exchange. Thus, for example in the embodiment illustrated in FIG. 7, the housing has a length of 200 mm and four heat pipes are arranged under the housing with their longitudinal axis perpendicular to the longitudinal axis of the housing. In other words, the longitudinal axis of the heat pipes located under the housing extends in the Z direction. A fluid loop evaporator has a length of about 400 mm so that efficient heat transfer is achieved when two housings 200 mm in length are arranged in the extension of one another along their longitudinal axis, as illustrated in FIG. 7.

Preferably, the housing has a length of about 400 mm. Advantageously, this length corresponds to the length of an evaporator.

The housing has a height of between 20 mm and 40 mm. This height is defined as a compromise between the requirement of minimizing the size of the housing due to dimensional constraints in a satellite, and the requirement of sufficient height for obtaining good performance in the heat transfer state and in the non-heat transfer state of the switch.

Preferably, the housing has a height of about 25 mm.

However, nothing precludes the use of larger or smaller heights according to specific needs.

The length, width, and height of the housing are chosen independently of each other.

Advantageously, the dimensions of the housing are 200 mm in length, 60 mm in width, and 25 mm in height.

In the embodiment shown in FIG. 1, the mixer 10 together with the liquid forms an electrohydrodynamic system 18. This electrohydrodynamic system 18 comprises two electrodes 20 spaced apart from one another by a spacing e. The spacing e is between 10 microns and 1000 microns. Preferably, the spacing e is equal to 100 microns. The electrodes 20 are immersed in the liquid. The electrodes 20 are each formed by a grid. One grid forming an electrode extends in a first plane P1. The other grid forming an electrode extends in a second plane P2.

The liquid is a dielectric liquid. This dielectric liquid is not a liquid crystal. The liquid is suitable for transferring heat. An EHD device as described in patent application WO 2015/084238 could be used.

In the embodiment shown, the mixer 10 comprises an electronic processing unit 24 housed in the appendage 22. The electronic processing unit 24 is able to receive a control signal and to apply or not apply a voltage between the two electrodes 20, based on this control signal.

In operation, the heat transfer device 2 is a thermal switch able to be switched between a low thermal conduction state called the first state, and a high thermal conduction state called the second state.

In the first state, illustrated in FIG. 1, no voltage is applied between the two electrodes 20. The liquid is motionless. The liquid is stagnant. Heat is not (or is barely) transferred from the first object to the second object, even if the two objects have a very different temperature.

Figure 2:
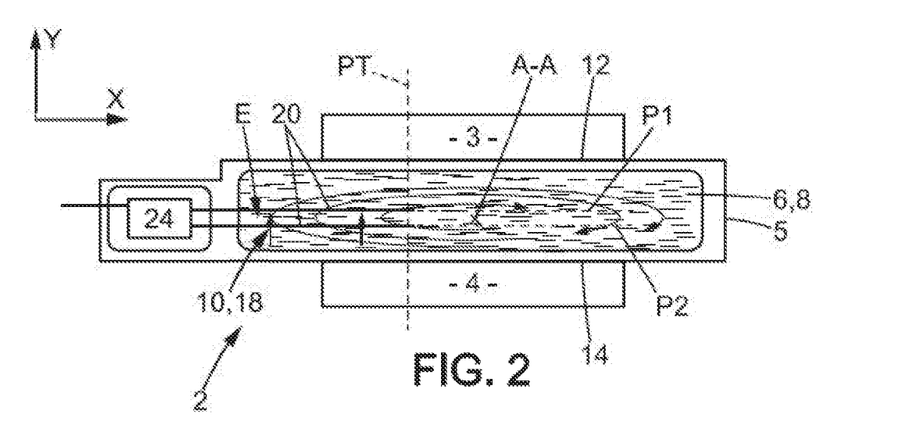
FIG. 2 is a schematic sectional view of the heat transfer device, of the first and second objects as illustrated in FIG. 1, the heat transfer device being in a second state.

In the second state illustrated in FIG. 2, a voltage is applied between the two electrodes 20. The liquid is set into motion. If the first main wall has a temperature greater than the second main wall, heat is transferred by convection from the first main wall 12 to the second main wall 14. If the second main wall has a temperature greater than the first main wall, heat is transferred by forced convection from the second main wall 12 to the first main wall 14.

To facilitate understanding the invention, a transverse plane PT, a first plane P1, and a second plane P2 are shown in FIG. 2. The transverse plane PT is substantially perpendicular to the first and second planes P1, P2 and passes through the end free of the electrodes 201, 202. A space called the inter-electrode space E is defined between the first plane P1, the second plane P2, and the transverse plane PT.

When the heat transfer device 2 is switched to the first state, the dielectric liquid is driven into a forced convection movement. This forced convection movement is a rotational movement about an axis A-A. The axis A-A is located outside the inter-electrode space E. During its rotation, the dielectric liquid passes through the first P1 and second planes P2 of the electrodes.

Advantageously, this system is bidirectional and can be combined with heat pipes or any other bidirectional heat transfer device, the combination remaining bidirectional.

Advantageously, according to the invention, the thermal conductance between the first main wall 12 and the second main wall 14 when the heat transfer device is in the first state, is four times less than the thermal conductance between the first main wall 12 and the second main wall 14 when the heat transfer device is in the second state.

Preferably, the thermal conductance between the first main wall 12 and the second main wall 14 in the first state is less than 40 W/K/m$^2$ and advantageously less than 8 W/K/m$^2$.

The thermal conductivity between the first main wall 12 and the second main wall 14 in the second state is greater than 250 W/K/m$^2$ and advantageously greater than 800 W/K/m$^2$.

Figure 3:
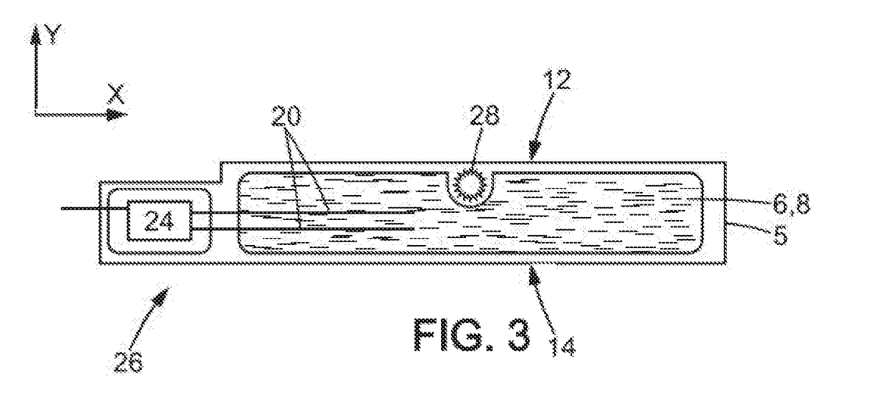
FIG. 3 is a schematic sectional view of a heat transfer device according to a second embodiment of the invention.

A heat transfer device 26 according to a second embodiment of the invention is illustrated in FIG. 3. This heat transfer device 26 is similar to the heat transfer device 2 according to the first embodiment of the invention except that a heat pipe 28 is integrated into the first main wall 12. The technical elements of the heat transfer device 26 according to the second embodiment that are identical to the technical elements of the heat transfer device 2 according to the first embodiment are denoted by the same references and will not be described a second time.

A heat pipe is a two-phase heat transfer device (using the latent heat of phase transformation to absorb or receive heat) in which the liquid and vapor phase coexist in an enclosure with a capillary structure extending along this enclosure so that the liquid phase and the gas phase are countercurrent, the liquid phase moving in the capillary structure (Source: standard ECSS-E-ST-31-02C of Dec. 12, 2012, § 3.2.7 § 2.20 and § 4.1).

The integration of the heat pipe 28 in the first main wall facilitates the transmission of heat from the heat transfer fluid contained in the heat pipe to the liquid contained in the internal cavity 6.

Figure 4:
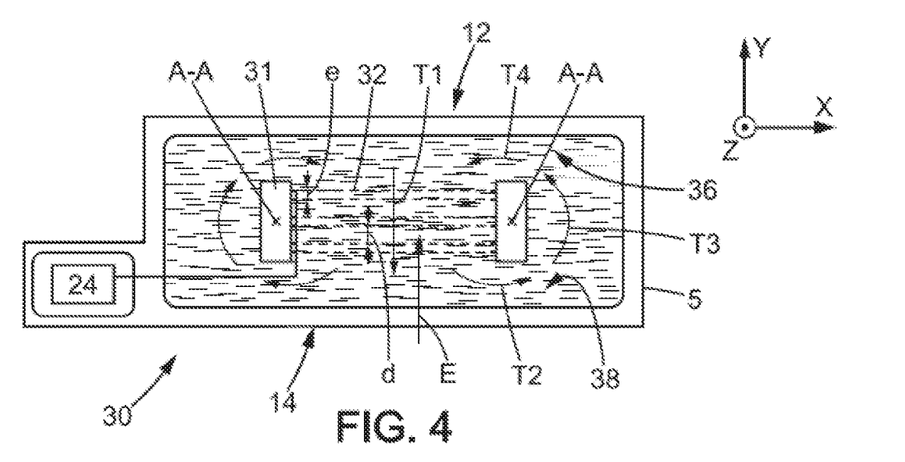
FIG. 4 is a schematic sectional view of a heat transfer device according to a third embodiment of the invention.

A heat transfer device 30 according to a third embodiment of the invention is illustrated in FIG. 4. The heat transfer device 30 according to the third embodiment of the invention will not be described in its entirety: only the differences with respect to the heat transfer device according to the first embodiment will be described. The technical elements of the heat transfer device 30 according to the third embodiment that are identical to the technical elements of the heat transfer device 2 according to the first embodiment are denoted by the same references and will not be described a second time.

In this embodiment, the two electrodes 20 are replaced by several pairs of identical electrodes 32. Each electrode has the form of a grid 32. The mixer 10 further comprises a holder adapted to carry the electrodes 32 so that they are superimposed onto each other along direction Y. The electrodes 32 extend in a plane (X, Z) parallel to the central plane of the main walls 12, 14. In addition, the electrodes are spaced apart from each other by a spacing e. The pairs of electrodes are spaced apart from each other by a free space d. The length of the free space d is generally different from the length of the spacing e. Each pair of electrodes is powered in parallel by the electronic processing unit 24. A device as described on FIG. 6 of the patent application WO 2015/084238 could be used.

Preferably, the electrodes 32 extend over a surface area that is smaller than the inner surface area of the first main wall 12. A portion of the cavity 6 is therefore not traversed by the electrodes and is intended for the return of fluid. Such an arrangement causes displacement of the fluid in a loop tangential to the first 12 and second 14 main walls. A compromise is to be found between the surface area of the electrodes in the form of a flat grid, which must be maximized in order to drive the fluid, and the remaining space which must be sufficient to ensure the return of fluid while limiting pressure drops.

The electronic processing unit 24 is adapted to apply a voltage to each electrode so as to generate a potential difference between each pair of adjacent electrodes. The potential differences between each pair of adjacent electrodes of the holder 31 are all of the same sign. A potential difference equal to the sum of the potential differences between each pair of adjacent electrodes is generated between the upper electrode and the lower electrode.

In operation, when the heat transfer device 30 is in the second state, the liquid is able to move in loops having a first path portion T1 directed in a direction Y perpendicular to the electrodes, a curved second path portion T2 in a direction that is in the plane of the second main wall, a third path portion T3 in a direction opposite to direction Y, and a fourth path portion T4 in a direction that is in the plane of the first main wall. In this embodiment, the dielectric liquid is driven in a forced convection movement. This forced convection movement is a rotational movement about two axes A-A located outside the inter-electrode space E. During its rotation, the dielectric liquid crosses the planes containing the grids forming electrodes.

Figure 5:
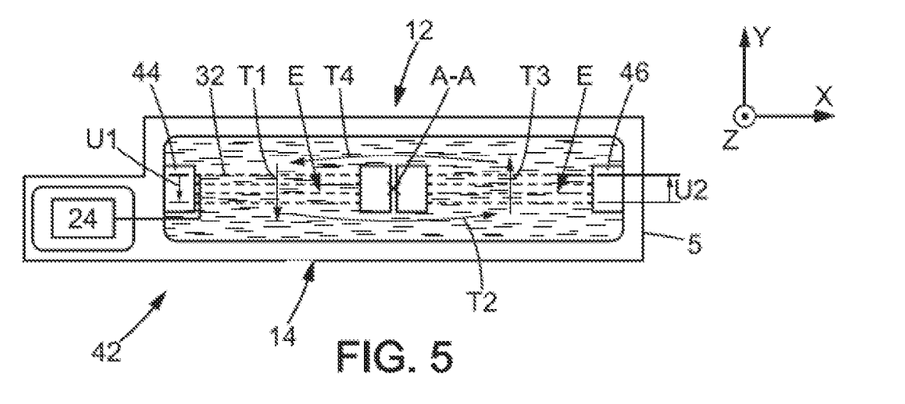
FIG. 5 is a schematic sectional view of a heat transfer device according to a fourth embodiment of the invention.

A heat transfer device 42 according to a fourth embodiment of the invention is illustrated in FIG. 5. The heat transfer device 42 according to the fourth embodiment of the invention will not be described in its entirety: only the differences with respect to the heat transfer device according to the third embodiment will be described. The technical elements of the heat transfer device 42 according to the fourth embodiment that are identical to the technical elements of the heat transfer device 30 according to the third embodiment are denoted by the same references and will not be described a second time.

The heat transfer device 42 according to the fourth embodiment of the invention comprises a first holder 44 carrying electrodes 32 and a second holder 46 carrying electrodes 32. The second holder 46 is arranged adjacent to the first holder 44. In this embodiment, the holders 44, 46 and electrodes 32 occupy all of the inner surface area of the housing 5.

The first 44 and the second 46 holders are identical to the holder of the heat transfer device according to the third embodiment, except that it comprises a smaller number of electrodes in the example illustrated in FIG. 5.

The electronic processing unit 24 is able to apply a first voltage U1 between the upper electrode and the lower electrode of the first holder 44 and a second voltage U2 between the upper electrode and the lower electrode of the second holder 46. The first voltage U1 is of opposite sign to the second voltage U2.

During operation, in the second state, the liquid 8 moves along a first path portion T1 which extends in direction Y across the electrodes of the first holder 44, a second path portion T2 in a direction parallel to the plane of the electrodes, a third path portion T3 which extends in direction Y across the electrodes of the second holder 46, and a fourth path portion T4 in a direction parallel to the plane of the electrodes.

In this embodiment, the dielectric liquid is driven in a forced convection movement. This forced convection movement is a rotational movement about an axis A-A located outside the inter-electrode space E. During its rotation, the dielectric liquid passes through the planes containing the grids forming electrodes.

Figure 6:
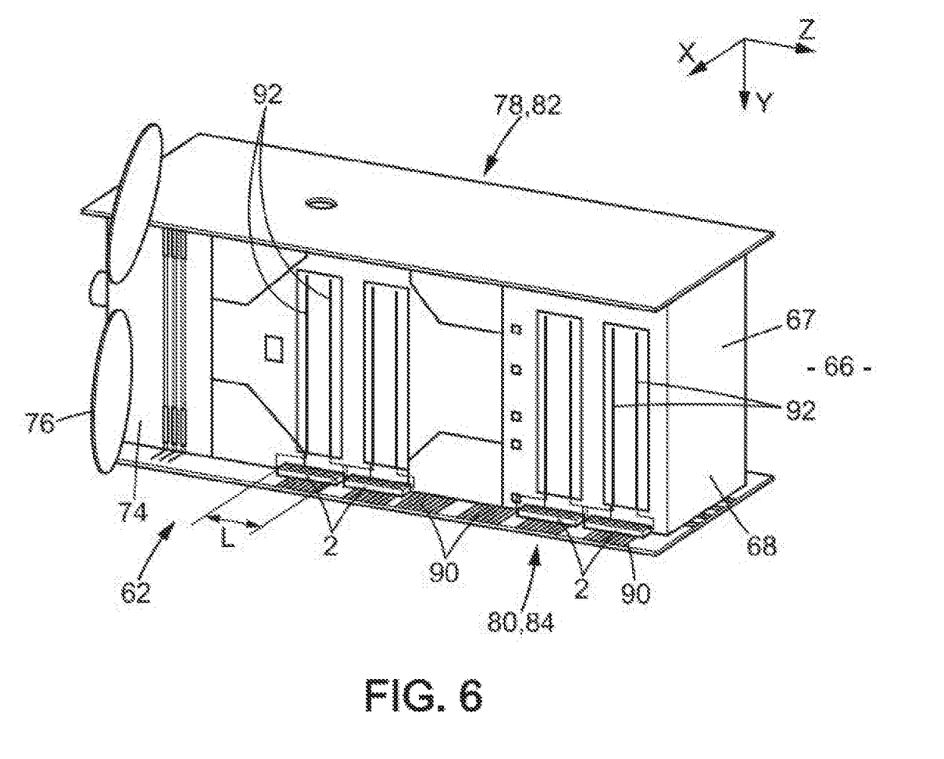
FIG. 6 is a schematic perspective view of a spacecraft according to the invention.

The heat transfer device according to the present invention can for example be mounted on a spacecraft 62 as illustrated in FIGS. 6 and 7.

With reference to FIG. 6, a spacecraft 62 that is a geostationary satellite is in the form of a parallelepipedal body defining an interior space 65 and an exterior space 66. This body always has the same face directed towards the Earth, this face being called the Earth face 68. The opposite face parallel to the Earth face 68 is called the zenith (anti-Earth) face. It is not represented in FIG. 6.

The -X face, also called the East face (not shown), and the +X face, also called the West face 74, are opposite faces, parallel to each other and perpendicular to the direction of movement of the spacecraft. Communication antennas 76 are generally attached to the -X and +X faces.

The -Y face, also called the North face 78, and the +Y face, also called the South face 80, are two other faces of the body. They are opposite, parallel to each other, and perpendicular to the North-South axis of the Earth.

A first main radiator 82, generally referred to as the North radiator, is attached to and extends over the -Y face 78. A second main radiator 84, generally referred to as the South radiator, is attached to and extends over the +Y face 80.

This body carries heat-dissipative equipment items, heat pipe networks 90 capable of transferring heat generated by the dissipative equipment items to the radiators 82, 84, heat pipe networks 92 capable of transferring heat to the -X face, and heat transfer devices 2, 102 mounted between the heat pipe networks 90, 92 in order to enable or prevent the transfer of heat from one heat pipe network to another. The heat-dissipative equipment items are generally located inside the body. They are not represented in FIG. 6.

The dissipative equipment items 86 are schematically illustrated in FIG. 7. They conventionally comprise active or passive radiofrequency equipment, electronic components, measurement instruments, computing units, and batteries.

A third heat pipe network (not shown) may also be mounted on the inner face of the radiator 82, and heat transfer devices 2 may be mounted between the third heat pipe network and heat pipe network 92.

FIG. 7 illustrates an exemplary use of two heat transfer devices 2, 102 according to the invention, mounted to provide redundancy between a first heat pipe network 90 mounted on face 80 and a second heat pipe network 92 mounted on face 74.

One heat transfer device is called the nominal heat transfer device 2. The other heat transfer device is called the redundant heat transfer device 102.

The first network 92 comprises a heat pipe called the nominal heat pipe 94 and a heat pipe called the redundant heat pipe 96.

In this example, the nominal heat pipe 94 and the redundant heat pipe 96 are in direct thermal contact with the first main wall of the nominal heat transfer device 2 and with the first main wall 12 of the redundant heat transfer device 102. The second main wall 14 of the nominal heat transfer device 2 and the second main wall 14 of the redundant heat transfer device 102 are in direct thermal contact with the heat pipes of the second heat pipe network 90.

This implementation of the invention provides double redundancy, because if a heat pipe is pierced by a meteorite or if a heat transfer device is pierced by a meteorite, the transmission of heat is ensured by the other heat pipe or the other heat transfer device.

The invention is advantageously used to suppress or greatly reduce the heat transfers between the dissipative equipment items 86 and the radiator, particularly when the radiator can no longer provide cooling (for example when the radiator mounted on the X face is in the sun). These heat transfers can advantageously be controlled according to whether or not the dissipative equipment item 86 is dissipating heat. Thus, during the phase of transferring into orbit with electric propulsion, the dissipative equipment items of the payload are not operational. The switching of the thermal device according to the invention into a state of low thermal conduction advantageously makes it possible for the radiators to no longer cool the internal space of the satellite. Conversely, when the satellite is placed in orbit, the device according to the invention is switched into a state of high thermal conduction in order to enable the thermal transfer of heat from the dissipative equipment items to the radiators.

Since the heat transfer device can be switched in less than 10 seconds, it can be used to provide precise control over the amount of heat transferred to the radiator. For this purpose, the heat transfer device comprises a control unit capable of transmitting a modulated signal to the electrodes 20, 32. For example, an on-or-off pulse width modulated signal may be transmitted.

The heat device equipped with a control unit thus allows more precise control, in real time, of the temperature of the dissipative equipment item. The modulation of the switching control signal can thus be generated as a function of the variations in dissipation of the dissipative equipment items or the thermal release efficiency of the radiators. Such a heat device thus makes it possible to specify reduced operating temperature ranges for certain dissipative equipment items, which makes it possible to increase the performance of the dissipative equipment items or to simplify the design.

This modulation would be particularly well suited to filters for telecom payloads, in particular output multiplexers ("OMUX"), or particularly sensitive equipment such as laser sources used in particular for LIDARs on Earth observation satellites.

The invention claimed is:

1. A heat transfer device of a spacecraft configured to transfer heat between a first object and a second object, comprising:
   a housing having a first main wall and a second main wall, the first main wall is configured to be in direct thermal contact by conduction with said first object, the second main wall is configured to be in direct thermal contact by conduction with said second object, said housing comprising a sealed internal cavity, a dielectric liquid contained in the internal cavity, and a mixer configured to set said dielectric liquid in motion,
   the heat transfer device is configured to be switched between a first state in which the dielectric liquid is stagnant and a second state in which the dielectric liquid is in motion and transfers heat by forced convection between the first main wall the second main wall,
   the mixer comprising at least two electrodes arranged with a spacing between one another and immersed in the dielectric liquid, wherein the at least two electrodes are each formed by a first grid extending in a first plane and a second grid extending in a second plane, the electrodes and the liquid forming an electrohydrodynamic system, when the heat transfer device is switched into the second state, the dielectric liquid passes across the electrodes during a forced convection movement, wherein the thermal conductance between the first main wall and the second main wall when the heat transfer device is in the first state is four times less than the thermal conductance between the first main wall and the second main wall when the heat transfer device is in the second state.

2. The heat transfer device according to claim 1, wherein the first object is a heat pipe.

3. The heat transfer device according to claim 1, wherein the second object is a heat pipe.

4. The transfer device according to claim 1, wherein at least one wall among the first main wall and the second main wall has a flat outer face.

5. The heat transfer device according to claim 1, wherein the housing has the shape of a parallelepiped having a length (L), a width (I), and a height (h), the height (h) being the distance between the first main wall and the second main wall, and wherein the height (h) has a dimension two times smaller than said width (I).

6. The heat transfer device according to claim 1, wherein said electrodes extend in a plane parallel to the central plane of the main walls.

7. The heat transfer device according to claim 1, wherein the mixer comprises a first holder configured to carry at least two electrodes, and a second holder configured to carry at least two electrodes, the first and second holders being arranged next to one another in a same plane parallel to a main wall, the at least two electrodes carried by the first holder being supplied a first voltage (U1), the at least two electrodes carried by the second holder being supplied a second voltage (U2), said second voltage (U2) being of opposite sign to the first voltage (U1), the circulation of fluid between the electrodes of the first holder and the circulation of fluid between the electrodes of the second holder being in opposite directions.

8. The heat transfer device according to claim 1, wherein the thermal conductance between the first main wall and the second main wall in the first state is less than 40 W/K/m$^2$.

9. The heat transfer device according to claim 1, wherein the thermal conductance between the first main wall and the second main wall in the second state is greater than 250 W/K/m$^2$.

10. A spacecraft, comprising:
    a body having a North face, a South face opposite to the North face, an East face, and a West face opposite to the East face;
       at least one radiator carried by at least one face among the North face, the South face, the East face, or the West face,
       at least one dissipative equipment item connected by a nominal heat transfer device to at least one radiator;
    wherein the nominal heat transfer device comprises at least one heat transfer device according to claim 1, so as to enable switchable thermal conductance between the dissipative equipment item and the radiator, according to the state of the heat transfer device.

11. The spacecraft according to claim 10, further comprising at least one redundant heat transfer device, a nominal heat pipe, and a redundant heat pipe, and wherein a main wall of the heat transfer device and a main wall of the at least one redundant transfer device is in thermal contact with said nominal heat pipe and said redundant heat pipe.

12. The heat transfer device according to claim 1, wherein the thermal conductance between the first main wall and the second main wall in the first state is less than 8 W/K/m$^2$.

13. The heat transfer device according to claim 1, wherein the thermal conductance between the first main wall and the second main wall in the second state is greater than 800 W/K/m$^2$.

* * * * *